United States Patent [19]
Kromrey

[11] 3,761,048
[45] Sept. 25, 1973

[54] MOLDS FOR ABLATIVE INJECTORS

[75] Inventor: Robert V. Kromrey, Fair Oaks, Calif.

[73] Assignee: Aerojet-General Corporation, El Monte, Calif.

[22] Filed: Nov. 23, 1970

[21] Appl. No.: 91,814

Related U.S. Application Data

[60] Division of Ser. No. 876,610, Nov. 13, 1969, Pat. No. 3,599,430, which is a continuation-in-part of Ser. No. 771,388, Oct. 29, 1968.

[52] U.S. Cl. .............................. 249/146, 249/183
[51] Int. Cl. ............................................. B22c 9/24
[58] Field of Search ................. 249/146, 149, 151, 249/154, 183

[56] References Cited
UNITED STATES PATENTS

| | | | |
|---|---|---|---|
| 1,124,237 | 1/1915 | Torrey | 249/151 |
| 2,903,062 | 9/1959 | Lambert | 249/146 X |
| 3,355,772 | 10/1967 | Kolberg | 249/151 X |

*Primary Examiner*—J. Spencer Overholser
*Assistant Examiner*—John S. Brown
*Attorney*—Edward O. Ansell and D. Gordon Angus

[57] ABSTRACT

An injector according to the present disclosure comprises an ablative body having an injector face adapted to form a portion of a rocket combustion chamber. A plurality of ports is disposed in the injector face for injecting propellant into the combustion chamber and manifold means is integrally formed within the body for supplying propellant to said ports. According to one features of the present invention, a mold is provided for casting the ablative injector. The injector formed by means of the mold according to the present disclosure is a unitary ablative injector for injecting propellant into the combustion chamber of a rocket engine.

3 Claims, 3 Drawing Figures

PATENTED SEP 25 1973  3,761,048
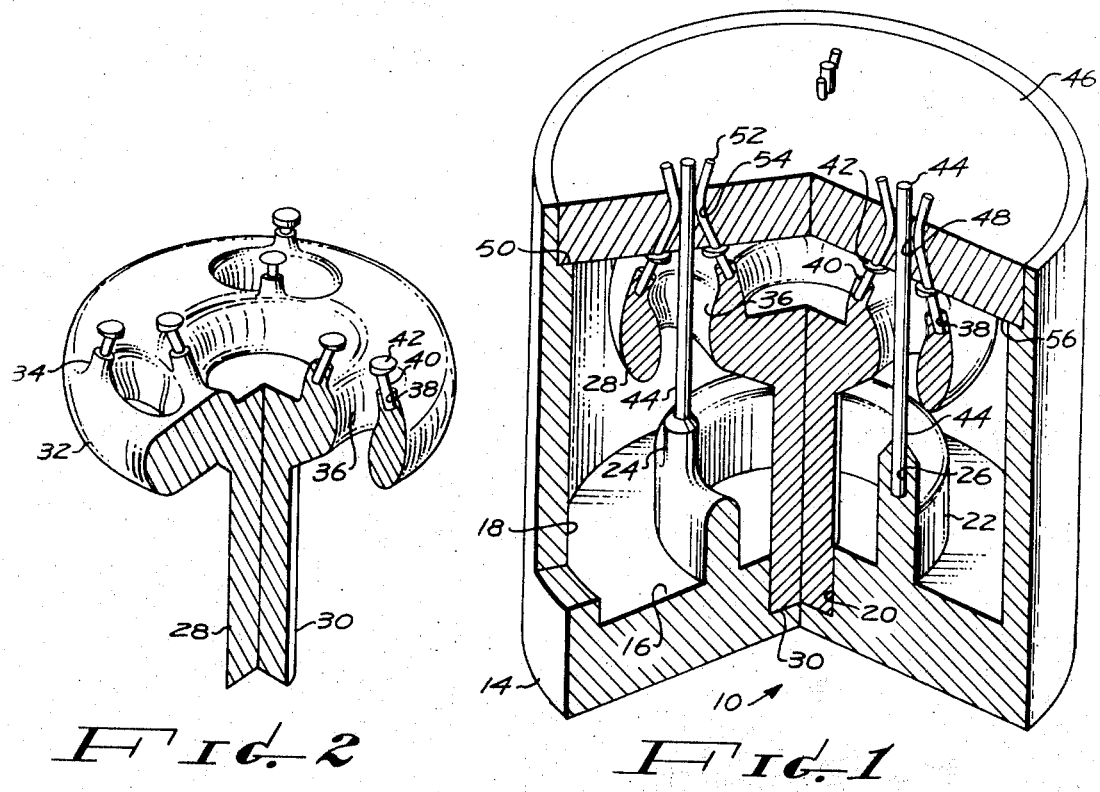
Fig. 2
Fig. 1
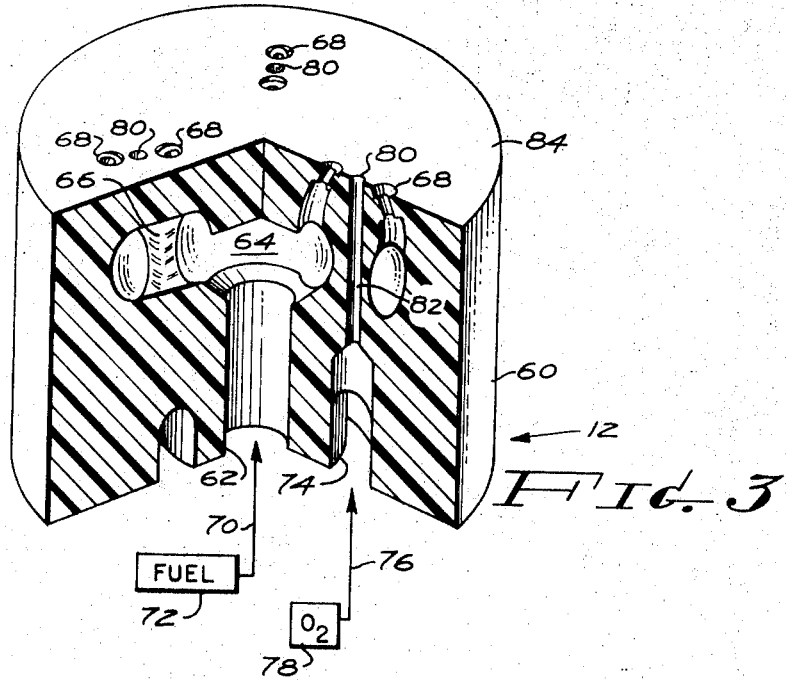
Fig. 3
INVENTOR.
ROBERT V. KROMREY

MOLDS FOR ABLATIVE INJECTORS

This application is a division of my U.S. co-pending application, Ser. No. 876,610 and now Pat. No. 3,599,430, filed Nov. 13, 1969, which in turn is a continuation-in-part of my earlier application Ser. No. 771,388 filed Oct. 29, 1968, entitled "Ablative Injectors."

This invention relates to ablative injectors and to molds for constructing ablative injectors.

Heretofore, injectors for rocket engines and the like have been constructed of metal or other thermally destructive material and have been subjected to failure due to thermal destruction of the injector face. Thermal destruction is most likely to occur when one or more of the following conditions exists: (1) When the combustion pressure in the rocket chamber is relatively low so that the pressure differential across the injector face is also relatively low, and thereby limiting the discharge of propellant into the combustion chamber; (2) when the local heat transfer rates are relatively high at the injector face; and (3) when the injector face is insufficiently cooled.

Heretofore, injectors have been cooled by means of a cooling system so as to dissipate heat from the injector face. Particularly, cooling systems have been utilized whereby coolant flows to the injector face. However, such cooling systems have not been completely effective due to the fact that failure of the cooling system or improper regulation of the coolant flow can cause a reduction of coolant flow to the injector face thereby resulting in localized destructive thermal conditions, or "hot spots," on the injector face. Also, the difficulty in regulating the coolant flow to the injector face has often made such cooling systems costly as well as bulky.

It has been difficult to maintain the integrity of the ports and manifolds in molded ablative devices. Thermosetting or ablative resins have a propensity for interchannel leakage due to porosity, delamination, cracking or other similar flaws. For rocket engine components, it is necessary to assure reliability through quality controls.

The present invention eliminates the major problems associated with cooling systems for injectors by providing an uncooled injector constructed of an ablative material.

It is an object of the present invention to provide an injector constructed of an ablative material which requires no cooling system.

Another object of the present invention is to provide an uncooled injector which is constructed of a unitary ablative body.

A further object of the present invention is to provide an uncooled injector having ports and channels or manifolds with a thin lining of a siliconeor fluorocarbon plastic material.

An injector according to the present invention comprises an ablative body for forming the injector face of an injector. A plurality of ports is disposed in the injector face for injecting propellant into the combustion chamber and manifold means integrally formed within the ablative body is provided for supplying propellant to the ports.

According to one feature of the present invention, the injector is constructed of a unitary ablative body.

According to another feature of the present invention, a mold is provided for casting a unitary ablative injector for a rocket engine.

The above and other features of this invention will be more fully understood from the following detailed description and the accompanying drawings, in which:

FIG. 1 is a perspective view in cutaway cross-section of a mold for use in constructing an ablative injector according to the presently preferred embodiment of the present invention;

FIG. 2 is a perspective view in cutaway cross-section of a portion of the mold illustrated in FIG. 1 for construction of propellant passages for an ablative injector according to the presently preferred embodiment of the present invention; and FIG. 3 is a perspective view in cutaway cross-section of an ablative injector according to the presently preferred embodiment of the present invention.

Referring to FIGS. 1 and 2, there is illustrated a mold 10 for construction of the ablative injector 12 illustrated in FIG. 3. Mold 10 comprises a main body section 14 having a lower internal surface 16 and cylindrical walls 18. Center bore 20 is formed in surface 16 of member 14 and a raised ring portion 22 extends upwardly from the lower surface 16. A plurality of cylindrical portions 24 extend upwardly from ring 22 and include bores 26 therein. Members 28 (shown in greater detail in FIG. 2) is assembled to member 14 by inserting cylindrical shaft 30 into aperture 20 of member 14. Member 28 includes toroidal portion 32 integral with cylindrical portion 30 and a plurality of cylindrical portions 34 extending upwardly from toroidal portion 32. As illustrated particularly in FIG. 2, cylindrical portions 34 are arranged in pairs and elliptical apertures 36 are formed through the toroidal portion 32 between adjacent ones of each pair of cylindrical portions 34. As illustrated in FIG. 1, member 28 is assembled to member 14 in such a manner that cylindrical portions 34 are aligned with cylindrical portions 24 of member 14. Apertures 38 are formed in each cylindrical portion 34.

As illustrated in FIG. 1, pins 40 are assembled into apertures 38 of toroidal portion 32 of member 28. Preferably, pins 40 include a flat head portion 42. Pins 44 are assembled into apertures 26 of member 14 and extend upwardly through elliptical apertures 36 between adjacent ones of the pairs of extrusions 34 in member 28.

Member 46 is assembled to member 14 by assembling member 46 over shoulder 50 of member 14 to fit snugly therewith. Pins 44 extend through apertures 48 of member 46. Pins 52 are then assembled through apertures 54 to abut the heads 42 of pins 40. Surface 56 of member 46 closes cavity 58 to form the entire enclosed mold 10.

The completed mold 10 illustrated in FIG. 1 is then filled with ablative material, such as a mixture of quartz and phenolic resin, and the resin is permitted to cure to form the ablative injector 12 illustrated in FIG. 3.

The mold 10 shown in FIG. 1 may be a sacrificial mold in that the mold 10, except possibly the pins 40 and 44, melt during the post cure of the molded ablative injector. The mold 10 may be composed of an alloy such as a tin and zinc alloy or a tin, zinc, and bismuth alloy. The mold 10 must retain its strength and shape until the cure temperature exceeds the temperature of the heat of distortion of the ablative resin. Also, the mold 10 must melt within a temperature range that is above the gelling temperature and below the destruction temperature of the ablative material. The melting temperature of the mold alloy may be in the range of about 400° to 420° F. The pins 40 and 44 may be piano wire of a predetermined gauge and are extracted after the molded injector has been cured.

Ablative injector 12 illustrated in FIG. 3 comprises a single member 60 constructed of ablative material. Injector 12 includes a port 62 (formed by shaft 30 of the mold) adapted to communicate through passage 64 to ring passage 66 (formed by toroidal portion 32). Ring passage 66 provides divided flows to a plurality of injector ports 68 (formed by pins 40). Injector ports 68 together with ring passage 66, passage 68 and port opening 62 are all formed by means of member 28 and pins 40 illustrated in FIG. 2. Port opening 62 may be connected by means of a suitable manifold, diagrammatically illustrated at 70, at a supply 72 of fuel. Ring port 74 (formed by ring portion 22 of the mold) may be connected by means of a suitable manifold, diagrammatically illustrated at 76, to a supply 78 of oxidizer. Ring port 74 is in fluid communication with injector ports 80 through passages 82 (formed by pins 44). Injector ports 68 and 80 are formed on injector face 84 which is formed by surface 56 of member 46.

The mold illustrated in FIG. 1 is constructed as hereinbefore described and filled with an ablative material such as quartz and phenolic resin. The resin is permitted to cure and the mold is disassembled and the ablative injector 10 illustrated in FIG. 3 is removed therefrom.

Reliability of the injector is improved by providing a thin lining in the ports and channels or manifolds. The desired lining may be accomplished by providing a thin coating of plastic material comprised of a silicone or fluorocarbon resin. Examples of a plastic material that is compatible with propellants are E. I. DuPont's TEFLON resin or Pennsalt Chemical Co.'s KYNAR resin. The parts of the mold which form the ports and manifolds are coated with a thin coating of plastic material which is flash sintered thereon. The thin layer of plastic material is bondized by treating it with a caustic solution such as sodium metal and napthalene to render the plastic material adherent to the thermosetting or ablative resin of the injector. When the mold material is removed, the molded ablative injector contains ports and channels or manifolds lined with the plastic material thereby preventing interchannel leakage.

In operation of the ablative injector, the injector is connected to the combustion chamber of a rocket engine (not shown) and fuel and oxidizer are permitted to pass through the respective ports 68 and 80 of the injector face 84. Since ports 68 and 80 are in close proximity to each other, the fuel and oxidizer are mixed in close proximity to the injector face 84 in the rocket chamber.

In the event that heat should build up adjacent the injector face during the operation of the rocket engine, the ablative material nondestructively erodes under the influence of the heat. Specifically, in the case of an ablative material formed of quartz and phenolic resins, the heat within the combustion chamber will decompose the phenolic resins to give off a cooling gas so as to maintain the injector face cool. The remaining quartz builds up an insulating face on the injection face to thereby reduce the thermal erosion effect.

The present invention thus provides a simple but effective apparatus for construction of an effective ablative injector. The injector is easily constructed and is effective in use.

This invention is not to be limited by the embodiments shown in the drawings and described in the descriptions, which are given by way of example and not of limitation, but only in accordance with the scope of the appended claims.

WHAT IS CLAIMED:

1. A mold in which a unitary ablative injector may be cast, said mold comprising: a first member having side walls for forming the side walls of the injector and having a bottom wall for forming an end of said injector, a first substantially toroidal portion integral with said bottom wall and extending into the chamber for forming a first manifold of said injector, a first bore in said bottom wall in said chamber substantially coaxial with said first portion, and a plurality of second bores in said first portion; a second member having a second substantially toroidal portion integral with a substantially cylindrical shank, said shank being mounted in said first bore so that said shank and second portion extend into said chamber from said bottom wall, a plurality of third bores in said second portion; a third member having a wall for forming an injector face, a plurality of fist apertures through said third member and a plurality of second apertures through said third member, each of said first apertures being in close proximity with a respective second aperture, and means for attaching said third member to the side walls of said first member so that each one of said first apertures is substantially aligned with a respective one of second bores and each of said second apertures is substantially aligned with a respective one of said third bores; and a plurality of first pins each supported by respective first apertures and second bores and a plurality of second pins each supported by respective second apertures and third bores.

2. A mold according to claim 1 wherein said first torroidal portion, said second torroidal portion, said cylindrical shank, said first pins and said second pins are coated with a thin layer of bondized fluorocarbon plastic material.

3. A mold according to claim 1 wherein said first torroidal portion, said second torroidal portion, said cylindrical shank, said first pins and said second pins are coated with a thin layer of bondized silicone plastic material.

* * * * *